United States Patent
Toll (10) Patent No.: US 6,430,526 B1
(45) Date of Patent: Aug. 6, 2002

(54) COMPUTER PROCESSABLE INTERCONNECT TOPOLOGY

(75) Inventor: Kim R. Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/218,918

(22) Filed: Dec. 22, 1998

(51) Int. Cl.[7] ............................................. G06F 17/50
(52) U.S. Cl. ................... 703/1; 703/22; 700/9; 700/17; 700/19
(58) Field of Search ..................... 703/1, 22; 700/9, 700/11, 12, 17, 18, 19

(56) References Cited

U.S. PATENT DOCUMENTS 5,502,436 A * 3/1996 Van Steenbrugge .... 340/825.25
5,507,668 A * 4/1996 Lambrinos et al. ......... 439/502

OTHER PUBLICATIONS

Lewis, S.H. Building a Web–Based Installation Guide Using VRML, Professional Communication Conference, IPCC '97 Proceedings, Crossroads in Communication, 1997 IEEE International , pp. 211–221, Aug. 1997.*

Burgum, F.J. Components for Home Systems, IEE Colloquium on Home Systems—Information, Entertainment and Control, Jan. 1990, pp. 5/1–5/3.*

Lui–Kwan, G. In–Flight Entertainment: The Sky's the Limit, Computer, vol. 33, Oct. 2000, pp. 98–101.*

Chaussy et al., D. Fully Programmable Cellular Audio and Video Matrixes, IEEE Transactions on Consumer Electronics, vol. 39, No. 3, Aug. 1993, pp. 422–428.*

* cited by examiner

*Primary Examiner*—Russell Frejd
(74) *Attorney, Agent, or Firm*—Schwegman Lundberg Woessner & Kluth (57) ABSTRACT

A computing system for processing a topology description language that describes an electronic environment having one or more electronic components such as a video cassette recorder (VCR), a television, a compact disc player, and an audio/video receiver. The computing system processes the description language in order to display suitable configurations, monitor usage, and even directly control the electronic components. The computing system includes a topology engine that processes the unique topology description language and generates topology data as a function of the topology descriptions. The topology engine provides an application programming interface (API) by which applications, such as a user interface, configure and control the electronic components.

21 Claims, 5 Drawing Sheets

COMPUTER PROCESSABLE INTERCONNECT TOPOLOGY

TECHNICAL FIELD

This invention relates generally to configuring and controlling electronic devices and, more particularly, to a method and apparatus for processing a topology language that describes the interconnection of multiple electronic devices.

BACKGROUND INFORMATION

Electronic components such as video cassette recorders (VCR), televisions, compact disc players, audio/video receivers, sound processors, etc., are becoming more and more sophisticated. Although such devices offer an increased level of performance and functionality, these devices are also becoming more complex to interconnect and control. Therefore, for these reasons and for other reasons stated below which will become apparent to those skilled in the art upon reading and understanding the present specification, there is a need in the art for a language that facilitates the description of electronic components. There is a need for a computing system capable of processing the language in order to recommend suitable configurations for the electronic components. There is also a need for such a computing system that further allows a user to directly control the electronic components based on the description of the electronic components.

SUMMARY OF THE INVENTION

As explained in detail below, the present invention provides a topology description language that facilitates the description of electronic components within an electronic environment. A computing system is described that processes the topology description language in order to display suitable configurations, monitor usage, and even directly control the electronic components. The computing system includes a topology engine that processes the unique topology description language and generates topology data as a function of the topology descriptions. An application interfaces with the topology engine to control and configure the electronic components. In one embodiment the application displays a set of controls for direct manipulation by a user. As requested by the application, the topology engine drives a control module that generates commands for controlling the electronic components. These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

Figure 1:
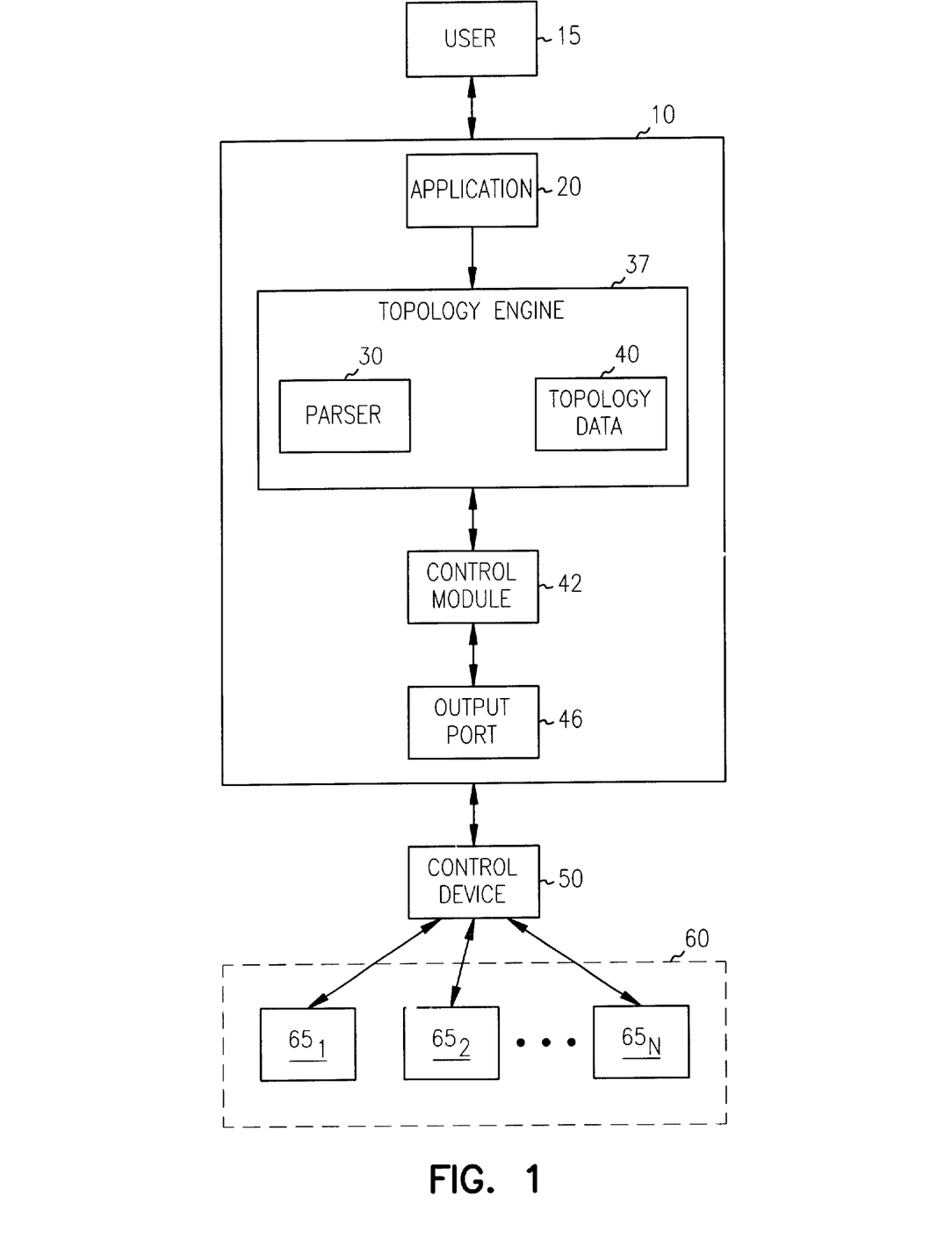
FIG. 1 is a block diagram of a computing system suitable for processing an interconnect topology description language according to the invention.

FIG. 1 illustrates a computing system 10 for controlling a plurality of electronic components 65 within an electronic environment 60. Computing system 10 represents a general purpose computing device and includes various internal computing components (not shown) including processing units, read only memory (ROM), random access memory (RAM), and one or more busses that operatively couple the components. There may be only one processing unit, such that computing system 10 comprises a single central-processing unit (CPU), or a plurality of processing units, commonly referred to as a parallel processing environment. Electronic components 65 represent various electronic components. For example, in one embodiment electronic environment 60 represent an audio/video home entertainment center and electronic components 65 may include a video cassette recorder (VCR), a television, a compact disc player, an audio/video receiver or even an antenna.

Topology engine 37 provides a high-level application programming interface (API) by which application 20 is able to configure and control electronic components 65. Application 20 may include a user interface for interacting with user 15 or may automatically control electronic environment 60 via topology engine 37 without input from user 15.

Topology engine 37 includes parser 30 that generates topology data 40 by processing topology descriptions for electronic environment 60 and electronic components 65. Each description conforms to a defined language, referred to herein as a topology description language. The topology description for electronic environment 60 describes the interconnect ability of the electronic components including their external inputs and outputs. The topology description for each electronic component 60, however, describes the respective component's internal modules and connections for coupling the external inputs to the outputs.

Control module 42 provides a lower-level API by which topology engine 37 accesses and manipulates individual controls of electronic components 65 such as tint, contrast and color for a television, volume for an receiver, frequency for a tuner, etc. Typical commands for the low-level API include getting the minimum and maximum value for a specific control, setting the value for the control, and retrieving the current state of the control. In one embodiment, control module 42 includes a control layer and a transport layer, wherein the control layer provides the lower-level API while the transport layer handles communication with electronic components 65 via output port 46.

Output port 46 is any suitable port, such as a serial or a parallel port, for communicating the commands to external control device 50. External control device 50 represents any suitable device for controlling electronic components 65 based on the commands from control module 42. For example, external control device 50 may be an infrared controller, known as an 'IR blaster', that is capable of producing infrared signals for controlling each electronic component 65.

Figure 2:
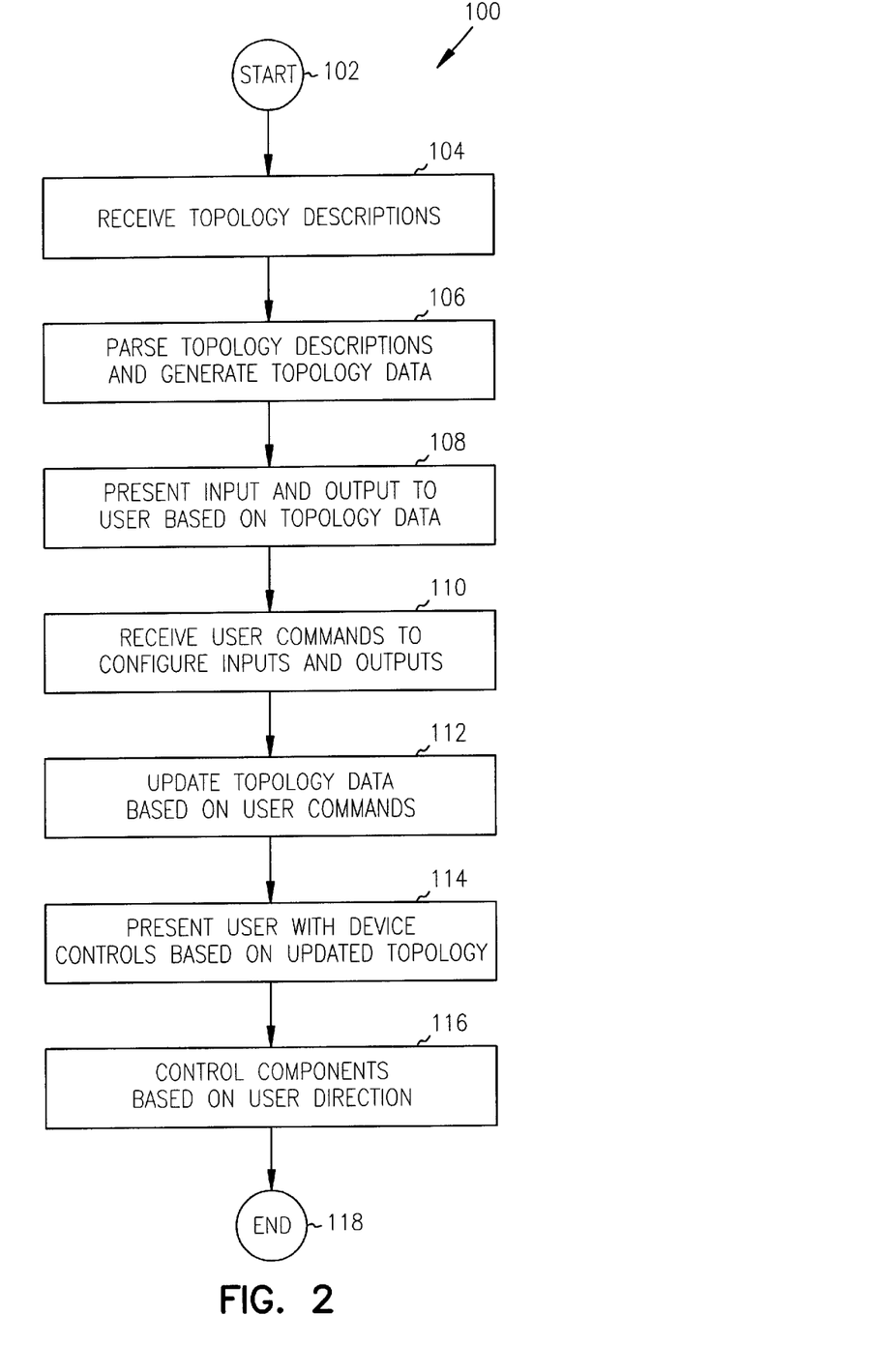
FIG. 2 is a flow chart one mode of operation of a computing system suitable for processing an interconnect topology description language.

FIG. 2 is a flow chart illustrating one mode of operation in which computing system 10 (FIG. 1) processes the topology descriptions in order to facilitate configuring and controlling control electronic components 65 of electronic environment 60. For exemplary purposes FIG. 2 illustrates an embodiment in which application 20 interfaces with user 15. The invention, however, is not so limited; application 20 may be automated such that it controls electronic components 65 without input from user 15.

Computing system 10 begins in logical block 102, proceeds to logical block 104 and receives a topology description for electronic environment 60 and for each electronic component 65. The topology descriptions may be may be provided by user 15 in any number of ways. For example, in one embodiment user 15 manually enters the topology description via application 20. In another embodiment, each manufacturer of each electronic component 65 provides a diskette containing a topology description for the respective electronic component 65. In yet another embodiment user 15 downloads a topology description for each electronic component 65 from the Internet.

In logical block 106, application 20 communicates topology descriptions to topology engine 37. Parser 30 processes topology descriptions and generates topology data 40. In one embodiment, topology data 40 is maintained as a database.

In logical block 108 application 20 queries topology engine 37 for a list of inputs (sources) and outputs (sinks) for electronic environment 60. Topology engine uses the topology data 40 to enumerate the inputs and outputs for each electronic component 65. Inputs are defined as any data source such as an antenna or VCR outputs that source data into electronic environment 60. Outputs are any data sinks such as the speakers of TV and the video and audio inputs on a VCR that sink data from electronic environment 60.

Topology engine 37 extracts the list of inputs and outputs from topology data 40 and returns the list to application 20. In one embodiment, application 20 processes the list and, based on the type of input and output, generates one or more sets of acceptable interconnections for electronic components 65. Application 20 displays the sets of acceptable interconnections such that user 15 may select one of the sets. In one variation of this embodiment, topology engine 37 determines a "connection quality" for each set of interconnections. Based on this determination, application 20 indicates to user 15 the set of interconnections that will yield the greatest connection quality. In another embodiment application 20 does not generate acceptable interconnections but graphically depicts each electronic component 65 and its corresponding inputs and outputs. In this embodiment, user 15 can graphically connect the various inputs and outputs by using a mouse or other pointing device.

In logical block 110 application 20 receives commands from user 15 to configure the inputs and outputs of electronic components 65. In one embodiment application 20 receives a user-selection of one of the sets of interconnections. In another embodiment application 20 receives individual commands to connect inputs and outputs of graphically displayed components. Application 20 processes the input and directs topology engine 37 to update topology data 40 in logical block 112.

In logical block 114, application 20 queries topology engine 37 for an aggregation of controls for electronic components 65 that are available based on the commands received from user 15. Examples of typical controls include tint, contrast and color for a television, volume for a receiver, frequency for a tuner, etc. Topology engine 37 queries topology data 40 and returns the list of controls to application 20. Application 20 may directly manipulate the controls or may display the controls for manipulation by user 15. In one embodiment application 20 graphically depicts the controls such that user 15 can manipulate electronic components 65 by using a mouse or other suitable pointing device.

In logical block 116 application 20 receives any directions from user 15 to manipulate one or more of the electronic components 65. Application 20 processes the directions and commands topology engine 37 accordingly. Topology engine 37 in turn directs control module 42 to generate proper commands for controlling electronic components 65. The generated commands are communicated to external control device 50 via output port 46. External control device 50 manipulates each electronic component 65 according to the generated commands. For example, in one embodiment external control device 50 produces infrared signals for controlling each electronic component 65. In this manner, computer 10 facilitates configuring and controlling electronic components 65.

Flow chart 100 has been described including logical blocks 102 through 118 in which computing system 10 processes topology descriptions in order to facilitate configuring and controlling electronic components 65 of electronic environment 60. This embodiment illustrates application 20 interacting with user 15; however, application 20 may be automated such that it controls electronic components 65 without input from user 15.

The Topology Description Language

The topology descriptions for each electronic component 65 conform to a topology language. The topology description language defines several units including Media, In, Out, Con, Ctrl, and Block. The Block unit is the base unit and may be nested to contain other units. The Media unit refers to the type of media used by the block; In defines an input to the block and a media type accepted by the input; Out defines an output from the block and a media type produced by the output; Con defines connections between an input and an output within the block and may be permanent or temporary; Ctrl defines a control for a block including knobs, one-shots and multi-position switches.

As illustrated in the example below, a topology description for a corresponding electronic component contains an outer Block. This outer Block contains all other units that describe the respective electronic component 65. Furthermore, in one embodiment a Block unit has the following syntax:

```
Block: label (
    #Type: blocktype
    #Manuf: "manufacturer info"
    #Model: "model info"
    #BlcCtrl: controlname
    [Unitdesc]
    ...
    [Unitdesc]
)
```

In this syntax, Type identifies functionality supported by the block such as a physical device, a switch that affects signal routing, a tuner, a pre amp, a speaker, a modulator or even a media source such as a tape player. Manufidentifies a manufacturer of the device, Model identifies the model number, and BlkCtrl provides a name for a control of the entire block such as a power switch for devices or a selection input for selector blocks. Unitdesc is a description for sub-units within the block.

EXAMPLE

Figure 3:
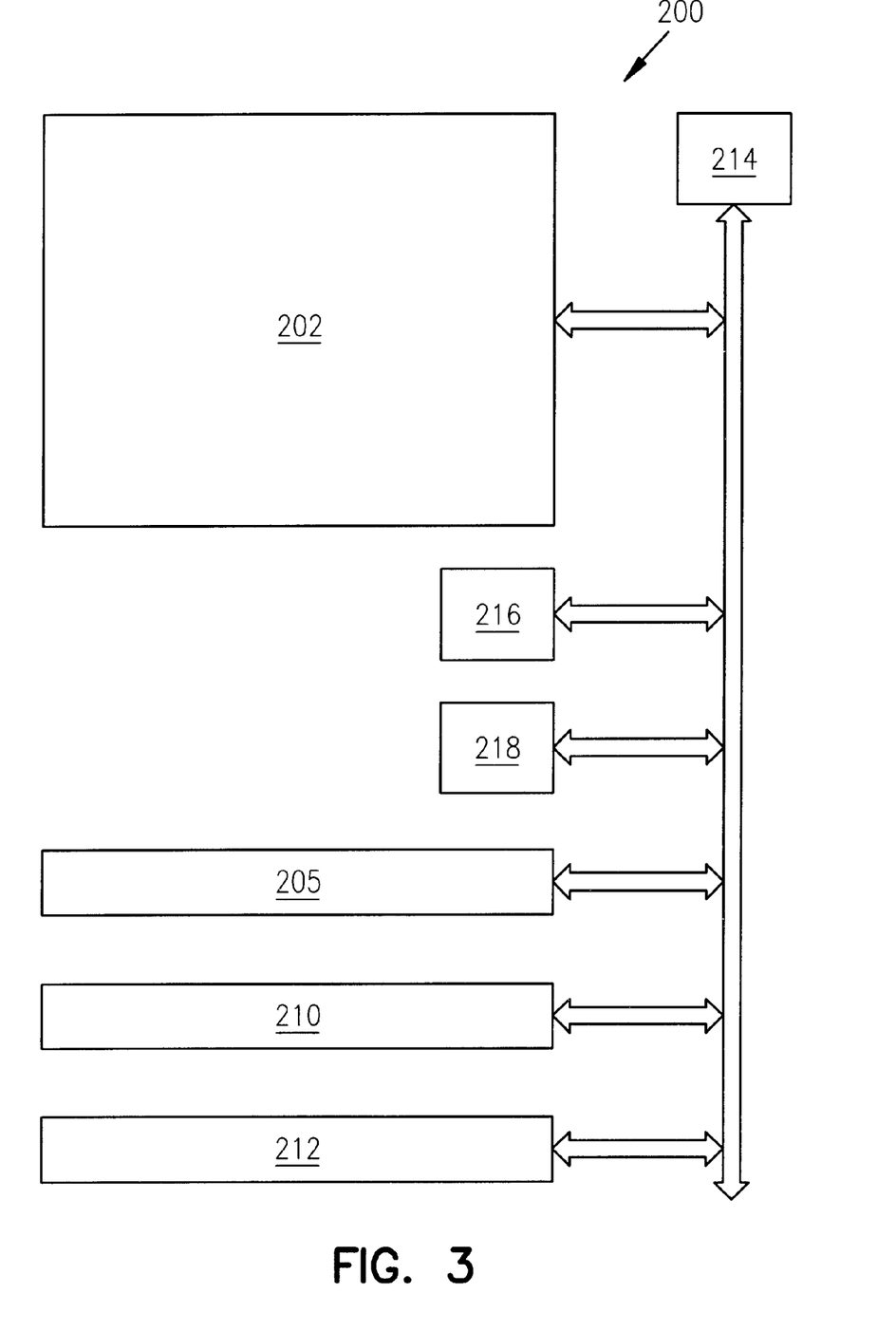
FIG. 3 is a block diagram illustrating an exemplary electronic environment suitable for control by the computing system of FIG. 1.

In order to illustrate the use of the inventive topology description language, a block diagram of an exemplary electronic environment 200 is illustrated in FIG. 3. In this example, electronic environment 200 has seven interconnected electronic components: television 202, video cassette recorder (VCR) 205, audio/video receiver 210, digital video disc player (DVD) 212, speakers 216, headphones 218 and antenna 214. The following listing is one embodiment of a topology description for electronic environment 200:

```
Block: LabStack(
    #Type: Undefined
    Media: RF
    Media: SAudio
    Media: CVideo
    Media: PA
    Include: TV( "TV_JVC.TOP" )
    Include: VCR( "VCR_RCA.top" )
    Include: Rcvr( "AVRcvr_D.top" )
    Include: DVD( "DVD_Pan.top" )
    Block: Antenna(
        #Type: Undefined
        Out: Out-RF
    )
    Block: Speakers(
        #Type: Speaker
        #UserName: "Surround"
        In: In-PA
    )
    Block: HeadPhones(
        #Type: Speaker
        #UserName: "Phones"
        In: In-PA
    )
    Con: 0 ( Antenna.Out-RF > VCR.AntIn-RF )
```

-continued

```
    Con: 0 ( VCR.AntOut-RF > TV.Ant-RF )
    Con: 0 ( Rcvr.VCR1Out-SAudio > VCR.Video1-SAudio )
    Con: 0 ( Rcvr.VCR1Out-CVideo > VCR.Video1-CVideo )
    Con: 0 ( VCR.Out-SAudio > Rcvr.VCR1In-SAudio )
    Con: 0 ( VCR.Out-CVideo > Rcvr.VCR1In-CVideo )
    Con: 0 ( DVD.Out-SAudio > Rcvr.VDP-SAudio )
    Con: 0 ( DVD.5_1Chan-SAudio > Rcvr.5_1Chan-SAudio )
    Con: 0 ( DVD.Out-SVideo > Rcvr.VDP-SVideo )
    Con: 0 ( Rcvr.Multi-SAudio > TV.Line1-SAudio )
    Con: 0 ( Rcvr.Multi-CVideo > TV.Line1-CVideo )
    Con: 0 ( Rcvr.Monitor-CVideo > TV.Line2-CVideo )
    Con: 0 ( Rcvr.SpeakerA-PA > Speakers.In-PA )
    Con: 0 ( Rcvr.Headphones-PA > Headphones.In-PA )
)
```

The above topology description defines an outer block entitled 'LabStack' that represents the entire electronic environment 200. Sub-blocks are defined for antenna 214, speakers 216 and headphones 218. Each sub-block defines available inputs and outputs for the corresponding electronic component. An include file is used for each electronic component that requires a more complex description such as television 202, VCR 205, receiver 210 and DVD 212. The above topology description defines fourteen connections that link the inputs and outputs of the defined sub-blocks. For example, the last connection links a headphones output of receiver 210 to an input of headphones 218.

Figure 4:
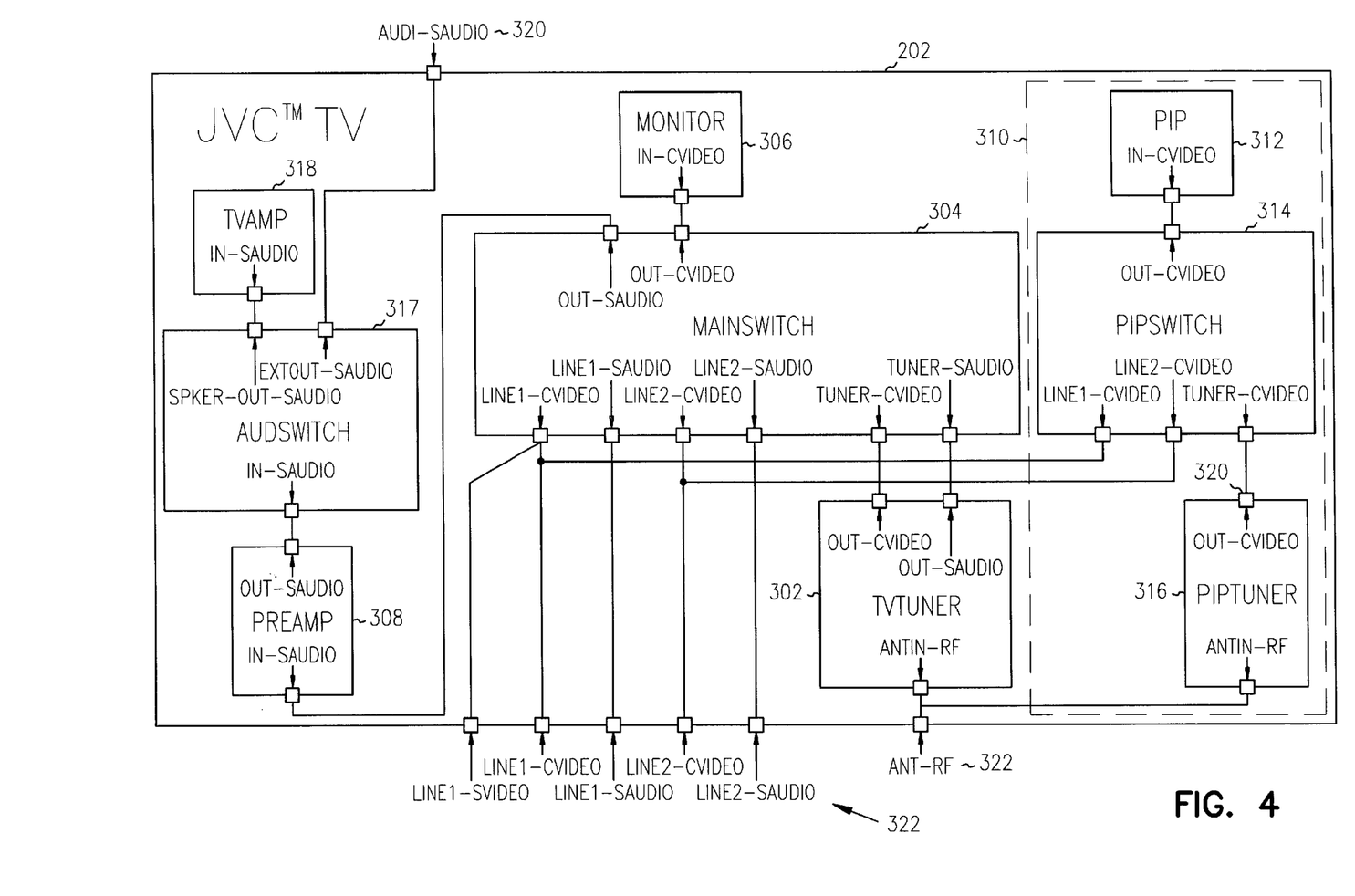
FIG. 4 is a block diagram illustrating an exemplary television (TV) of the electronic environment of FIG. 3.
Figure 5:
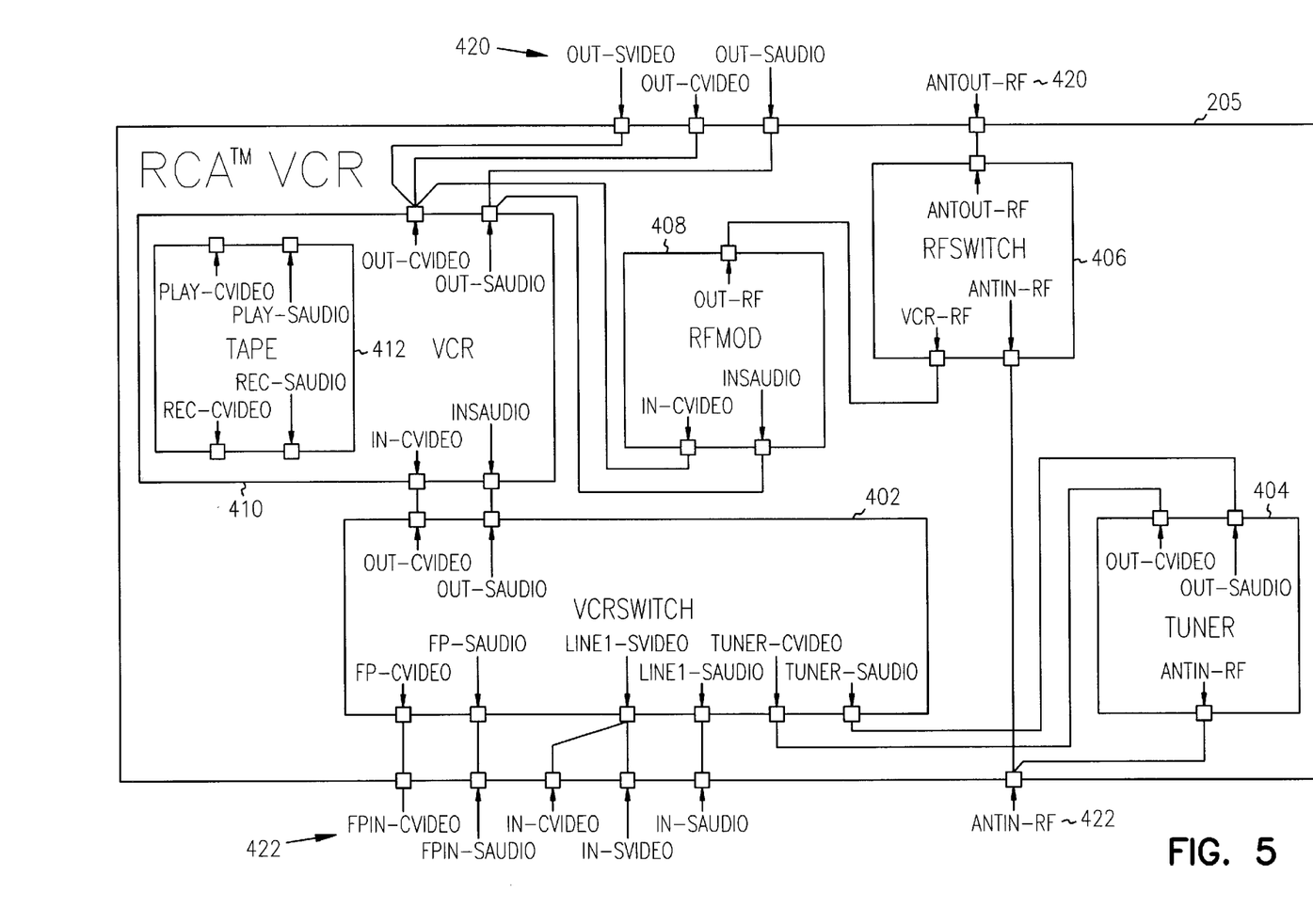
FIG. 5 is a block diagram illustrating an exemplary video cassette recorder (VCR) of the electronic environment of FIG. 3.

FIG. 4 is a block diagram further detailing television 202 of FIG. 3. Similarly, FIG. 5 is a block diagram further detailing VCR 205. As illustrated in FIG. 4, television 202 includes tuner 302, main switch 304, monitor 306, pre-amplifier 308, audio switch 317, TV amp 318 and picture-in-picture (Pip) module 310 that includes Pip tuner 316, Pip switch 314 and Pip monitor 312. Furthermore television 202 has six inputs 322 and one output 320. The following listing is one embodiment of a topology description for television 202:

```
Block: TV(
    #Type: Device
    #Manuf: "JVC"
    #Model: "AV-32"
    #BlkCtrl: Power
    #File: "C:\SmartTV\TV_JVC.TOP"
    Ctrl: Power ( Type:MultiPos   Max:1   Step:1   Unsd:0   Val( Off On ) Tran(
                Type:Serial   CVal:0 Sel:":wr" Signal( X POR ) TOut:3 ) )
    Ctrl: Menu ( Type:MultiPos   Max:20   Step:1   OSD:Yes   Opt( Hide )
                Val( Clock Timer Lock Speaker AudioOut Language CloseCaption
                Setup ChanSum TunerMode Tint Color Picture Brightness Detail
                Notch NoiseMute SVS Bass Treble Balance ) Tran( Type:Serial
                CVal:3   Sta:"MnUp" Up:"~MnDn"   Dn:"~MnUp"   ETS:60 ) )
    Media: SAudio
    Media: CVideo
    Media: SVideo
    Media: RF
    In: Line1-SAudio
    In: Line1-CVideo
    In: Line1-SVideo
    In: Line2-SAudio
    In: LIne2-CVideo
    In: Ant-RF
    Out: Audio-SAudio
    Block: Pip(
        #Type: Device
        #BlkCtrl: PipCtrl
        Ctrl: PipCtrl ( Type:MultiPos   Max:1   Step:1 Unsd:0 Val( Off
                    On ) Tran( Type:Serial CVal:0 Reset:POR Sel:"Pip"))
        In: Ant-RF
```

-continued

```
        In: Line1-CVideo
        In: Line2-CVideo
        Block: PipTuner(
            #Type: Tuner
            #BlkCtrl: Channel
            In: AntIn-RF
            Out: Out-SAudio
            Out: Out-CVideo
            Con: Tuner ( AntIn-RF > Out-SAudio )
            Con: Tuner ( AntIn-RF > Out-CVideo )
            Ctrl: Channel ( Type:MultiPos   Max:125   Step:1   Opt( Video
                TV Cable ) Tran( Type:Serial CVal:15 Def:2 Up:"~PChU"
                        Dn:"~PChD"   TOut:1 ) )
        )
        Block: PipSwitch(
            #Type: Selector
            #BlkCtrl: PipSource
            In: Line1-CVideo
            In: Line2-CVideo
            In: Tuner-CVideo
            Out: Out-CVideo
            Ctrl: PipSource ( Type:MultiPos Max:2 Step:1 Unsd:X Val(
                TV Video1 Video2 ) Tran( Type:Serial CVal:0 Sel:"PSrc"))
            Con: TV ( Tuner-CVideo > Out-CVideo )
            Con: Video1 ( Line1-CVideo > Out-CVideo )
            Con: Video2 ( Line2-CVideo > Out-CVideo )
        )
        Block: PipMon(
            #Type: Monitor
            #UserName: "PIP"
            In: In-CVideo
            Ctrl: FreezeFrame ( Type:OneShot Tran( CVal:0 Sel: "PFrz"))
            Ctrl: PipLocation ( Type:MultiPos Max:3 Step:1 Val( TopLeft
                    BottomLeft BottomRight TopRight ) Tran( Type:Serial
                        CVal:2   Sel:"PMov" ) )
        )
        Con: 0 ( Ant-RF > PipTuner.AntIn-RF )
        Con: 0 ( Line1-CVideo > PipSwitch.Line1-CVideo )
        Con: 0 ( Line2-CVideo > PipSwitch.Line2-CVideo )
        Con: 0 ( PipTuner.Out-CVideo > PipSwitch.Tuner-CVideo )
        Con: 0 ( PipSwitch.Out-CVideo > PipMon.In-CVideo )
)
Block: TVTuner(
    #Type: Tuner
    #BlkCtrl: Channel
    In: AntIn-RF
    Out: Out-SAudio
    Out: Out-CVideo
    Con: Tuner ( AntIn-RF > Out-SAudio )
    Con: Tuner ( AntIn-RF > Out-CVideo )
    Ctrl: Channel ( Type:MultiPos   Min:2   Max:125   Step:1   Opt(
            Video Audio TV Cable ) Tran( Type:Numeric CVal:10 Def:2
            Dig0:"0"   Dig1:"1"   Dig2:"2"   Dig3:"3"   Dig4:"4"
            Dig5:"5"   Dig6:"6"   Dig7:"7"   Dig8:"8"   Dig9:"9"
            D100:"100"   ReqDig:2 ) )
)
Block: TVSwitch(
    #Type: Selector
    #BlkCtrl: Input
    In: Line1-SAudio
    In: Line1-CVideo
    In: Line2-SAudio
    In: Line2-CVideo
    In: Tuner-SAudio
    In: Tuner-CVideo
    Out: LineOut-SAudio
    Out: TunerOut-SAudio
    Out: Out-CVideo
    Ctrl: Input ( Type:MultiPos Max:2 Step:1 Unsd:X Val( TV
            Video1 Video2 ) Tran( Type:Serial CVal:2 Sel:"Inpt" ) )
    Con: Video1 ( Line1-SAudio > LineOut-SAudio )
    Con: Video1 ( Line1-CVideo > Out-CVideo )
    Con: Video2 ( Line2-SAudio > LineOut-SAudio )
    Con: Video2 ( Line2-CVideo > Out-CVideo )
    Con: TV ( Tuner-SAudio > TunerOut-SAudio )
    Con: TV ( Tuner-CVideo > Out-CVideo )
)
Block: Monitor(
    #Type: Monitor
```

-continued

```
    #UserName: "TV"
    In: In-CVideo
    Ctrl: Tint (Type:Knob Max:64 Step:1 OSD:Yes Tran( Type:Sym CVal:32
              Sta:"MnL"  Up:"MnR"  Dn:"MnL"  End:"Exit"  Ind:Menu
              IVal:Tint  Opt( CEftEnd )  ETS:2 ) )
    Ctrl: Color ( Type:Knob Max:64 Step:1 OSD:Yes Tran( Type:Sym  CVal:32
              Sta:"MnL"  Up:"MnR"  Dn:"MnL"  End:"Exit"  Ind:Menu
              IVal:Color  Opt( CEftEnd )  ETS:2 ) )
    Ctrl: Picture ( Type:Knob Max:64 Step:1 OSD:Yes Tran( Type:Sym CVal:32
              Sta:"MnL"  Up:"MnR"  Dn:"MnL"  End:"Exit"  Ind:Menu
              IVal:Picture  Opt( CEftEnd )  ETS:2 ) )
    Ctrl: Brightness ( Type:Knob Max:64  Step:1  OSD:Yes Tran( Type:Sym
              CVal:32  Sta:"MnL"  Up:"MnR"  Dn:"MnL"  End:"Exit"
              Ind:Menu  IVal:Brightness  Opt( CEftEnd )  ETS:2 ) )
    Ctrl: Detail ( Type:Knob Max:64 Step:1 OSD:Yes Tran( Type:Sym CVal:32
              Sta:"MnL"  Up:"MnR"  Dn:"MnL"  End:"Exit"  Ind:Menu
              IVal:Detail  Opt( CEftEnd )  ETS:2 ) )
    Ctrl: Notch ( Type:MultiPos  Max:1  Step:1  OSD:Yes  Val( Off
              On ) Tran( Type:Serial  CVal:0  Sel:"MnR"  End:"Exit"
              Ind:Menu  IVal:Notch  Opt( CEftEnd )  ETS:2 ) )
    Ctrl: Noise_Mute ( Type:MultiPos  Max:1  Step:1  OSD:Yes  Val(
              Off On ) Tran( Type:Serial  CVal:0  Sel:"MnR"  End:"Exit"
              Ind:Menu  IVal:NoiseMute  Opt( CEftEnd )  ETS:60 ) )
    Ctrl: Closed_Caption ( Type:MultiPos Max:2 Step:1 OSD:Yes
         Val( Off Captions Text ) Tran( Type:Serial  CVal:1  Sel:"CC" ) )
    Ctrl: CloseCap ( Type:MultiPos  Max:2  Step:1  OSD:Yes  Opt(
              Hide )  Val( Caption Text BackGround ) Tran( Type:Serial
              CVal:2  Reset:POR  Sta:"MnR"  Up:"MnDn"  Dn:"MnUp"
              Ind:Menu  IVal:CloseCaption  Opt( RValExp )  ETS:60 ) )
    Ctrl: CC_BackGround ( Type:MultiPos  Max:1  Step:1  OSD:Yes  Val(
           Black Clear ) Tran( Type:Serial  CVal:0  Sel:"MnR" End:"Exit"
              Ind:CloseCap  IVal:BackGround  Opt( CEftEnd )  ETS:60 ) )
    Ctrl: Video_Status ( Type:MultiPos  Max:2  Step:1  OSD:Yes  Val(
         Standard Choice Theater ) Tran( Type:Serial  CVal:0  Sta:"VSta"
              Sel:"VSta"  ETS:2 ) )
)
Block: TunerPreAmp(
    #Type: PreAmp
    In: In-SAudio
    Out: Out-SAudio
    Con: 0 ( In-SAudio > Out-SAudio )
    Ctrl: Volume ( Type:Knob Max:50 Step:1 OSD:Yes Tran( Type:Sym CVal:12
              Up:"VUp"  Dn:"VDn" ) )
    Ctrl: Bass ( Type:Knob Max:64 Step:1 OSD:Yes Tran( Type:Sym  CVal:32
              Up:"MnR" Dn:"MnL"  End:"Exit"  Ind:Menu  IVal:Bass
              Opt( CEftEnd )  ETS:60 ) )
    Ctrl: Treble ( Type:Knob Max:64 Step:1 OSD:Yes Tran( Type:Sym CVal:40
              Up:"MnR"  Dn:"MnL"  End:"Exit"  Ind:Menu  IVal:Treble
              Opt( CEftEnd )  ETS:60 ) )
    Ctrl: Balance ( Type:Knob Max:64 Step:1 OSD:Yes Tran( Type:Sym CVal:32
              Up:"MnR"  Dn:"MnL"  End:"Exit"  Ind:Menu  IVal:Balance
              Opt( CEftEnd )  ETS:60 ) )
    Ctrl: Hyper_Surround ( Type:MultiPos  Max:1  Step:1  OSD:Yes
              Val( Off On ) Tran( Type:Serial  CVal:0  Sta:"HSnd"
              Sel:"HSnd"  ETS:2 ) )
    Ctrl: MTS ( Type:MultiPos  Max:2  Step:1  OSD:Yes  Val( Stereo
           SAP Mono ) Tran( Type:Serial  CVal:2  Sta:"MnDn"  Sel:"MnR"
              End:"MnUp Exit"  Ind:Menu  IVal:Balance  Opt( CEftEnd )
              ETS:60 ) )
)
Block: LinePreAmp(
    #Type: PreAmp
    In: In-SAudio
    Out: Out-SAudio
    Con: 0 ( In-SAudio > Out-SAudio )
    Ctrl: Volume ( Type:Knob Max:50 Step:1 OSD:Yes Tran( Type:Sym  CVal:3
              Up:"VUp"  Dn:"VDn" ) )
    Ctrl: Bass ( Type:Knob Max:64 Step:1 OSD:Yes Tran( Type:Sym  CVal:32
              Up:"MnR"  Dn:"MnL"  End:"Exit"  Ind:Menu  IVal:Bass
              Opt( CEftEnd )  ETS:60 ) )
    Ctrl: Treble ( Type:Knob Max:64 Step:1 OSD:Yes Tran( Type:Sym CVal:32
              Up:"MnR"  Dn:"MnL"  End:"Exit"  Ind:Menu  IVal:Treble
              Opt( CEftEnd )  ETS:60 ) )
    Ctrl: Balance ( Type:Knob Max:64 Step:1 OSD:Yes Tran( Type:Sym CVal:32
              Up:"MnR"  Dn:"MnL"  End:"Exit"  Ind:Menu  IVal:Balance
              Opt( CEftEnd )  ETS:60 ) )
    Ctrl: Hyper_Surround ( Type:MultiPos  Max:1  Step:1  OSD:Yes
              Val( Off On ) Tran( Type:Serial  CVal:0  Sta:"HSnd"
              Sel:"HSnd"  ETS:2 ) )
```

```
)
Block: AudSwitch(
    #Type: Selector
    #BlkCtrl: Speaker
    In: In-SAudio
    Out: SpkrOut-SAudio
    Out: ExtOut-SAudio
    Ctrl: Speaker ( Type:MultiPos   Max:1   Step:1   Unsd:0   OSD:Yes
                    Val( Off On ) Tran( Type:Serial   CVal:0   Def:1   Sel:"MnR"
                    End:"Exit" Ind:Menu   IVal:Speaker   Opt( CEftEnd )
                    ETS:60 ) )
    Con: On ( In-SAudio > SpkrOut-SAudio )
    Con: On ( In-SAudio > ExtOut-SAudio )
    Con: Off ( In-SAudio > ExtOut-SAudio )
)
Block: TVAmp(
    #Type: Speaker
    #UserName: "TV"
    #Pref: 9500
    In: In-SAudio
    Ctrl: Mute ( Type:MultiPos   Max:1   Step:1   OSD:Yes   Val( On
                 Off ) Tran( Type:Serial   CVal:1   Reset:POR   Def:1   Sel:"Mute" ) )
)
Con: 0 ( Ant-RF > TVTuner.AntIn-RF )
Con: 0 ( Ant-RF > Pip.Ant-RF )
Con: 0 ( Line1-SAudio > TVSwitch.Line1-SAudio )
Con: 0 ( Line1-CVideo > TVSwitch.Line1-CVideo )
Con: 0 ( Line1-SVideo > TVSwitch.Line1-CVideo )
Con: 0 ( Line1-CVideo > Pip.Line1-CVideo )
Con: 0 ( Line1-SVideo > Pip.Line1-CVideo )
Con: 0 ( Line2-SAudio > TVSwitch.Line2-SAudio )
Con: 0 ( LIne2-CVideo > TVSwitch.Line2-CVideo )
Con: 0 ( LIne2-CVideo > Pip.Line2-CVideo )
Con: 0 ( TVTuner.Out-SAudio > TVSwitch.Tuner-SAudio )
Con: 0 ( TVTuner.Out-CVideo > TVSwitch.Tuner-CVideo )
Con: 0 ( TVSwitch.TunerOut-SAudio > TunerPreAmp.In-SAudio )
Con: 0 ( TVSwitch.LineOut-SAudio > LinePreAmp.In-SAudio )
Con: 0 ( TVSwitch.Out-CVideo > Monitor.In-CVideo )
Con: 0 ( TunerPreAmp.Out-SAudio > AudSwitch.In-SAudio )
Con: 0 ( LinePreAmp.Out-SAudio > AudSwitch.In-SAudio )
Con: 0 ( AudSwitch.SpkrOut-SAudio > TVAmp.In-SAudio )
Con: 0 ( TunerPreAmp.Out-SAudio > Audio-SAudio )
Con: 0 ( LinePreAmp.Out-SAudio > Audio-SAudio )
)
```

The above topology description defines an outer block entitled 'TV' that describes TV 202 including available inputs and outputs and the internal electronic modules and connections. More specifically, the TV block defines two controls, 'Power' and 'Menu'. Four different types of media are accepted; Saudio, Cvideo, Svideo and RF. Six inputs and one output are available and correspond to inputs 322 and output 320 (FIG. 4), respectively. Sub-blocks are defined for each internal electronic module including tuner 302, main switch 304, monitor 306, pre-amplifier 308, audio switch 317, TV amp 318 and Pip module 310 that includes Pip tuner 316, Pip switch 314 and Pip monitor 312. Each sub-block defines inputs and outputs for the corresponding electronic module. The outer TV block defines connections between each sub-block while each sub-block defines internal connections.

As illustrated in FIG. 5, VCR 205 includes VCR switch 402, tuner 404, RF switch 406, RF modulator 408 and VCR module 410, which includes tape controller 412. Furthermore, VCR 205 has six inputs 422 and four outputs 420. The following listing is one embodiment of a topology description for VCR 205:

```
Block: VCR(
    #Type: Device
    #Manuf: "RCA"
    #Model: "VR725HF"
    #BlkCtrl: Power
    #File: "C:\SmartTV\VCR_RCA.top"
    Ctrl: Power ( Type:MultiPos   Max:1   Step:1   Unsd:0   Val( Off On ) Tran(
                  Type:Random   CVal:0   Signal( X POR )   TOut:6   Code( "Off"
                  "On") ) )
    Media: SAudio
    Media: CVideo
    Media: SVideo
    Media: RF
    In: Video2-SAudio
```

-continued

```
In: Video2-CVideo
In: Video1-SAudio
In: Video1-SVideo
In: Video1-CVideo
In: AntIn-RF
Out: Out-SAudio
Out: Out-SVideo
Out: Out-CVideo
Out: AntOut-RF
Block: Tuner(
    #Type: Tuner
    #BlkCtrl: Channel
    In: AntIn-RF
    Out: Out-SAudio
    Out: Out-CVideo
    Con: Tuner ( AntIn-RF > Out-SAudio )
    Con: Tuner ( AntIn-RF > Out-CVideo )
    Ctrl: Channel ( Type:MultiPos   Min:2   Max:125   Step:1   Opt(
                Video Audio TV Cable ) Tran( Type:Numeric   CVal:10   Def:2
                Sta:"Paus"   End:"Paus"   Dig0:"0"   Dig1:"1"   Dig2:"2"
                Dig3:"3"   Dig4:"4"   Dig5:"5"   Dig6:"6"   Dig7:"7"
                Dig8:"8"   Dig9:"9"   ReqDig:2 ) )
)
Block: RFSwitch(
    #Type: Selector
    #BlkCtrl: TV_VCR
    In: AntIn-RF
    In: VCRIn-RF
    Out: AntOut-RF
    Ctrl: TV_VCR ( Type:MultiPos   Max:1   Step:1   Unsd:1   Val( VCR
         Ant ) Tran( Type:Serial   CVal:1   Reset:POR   Def:1   Sel:"TvVc" ) )
    Con: Ant ( AntIn-RF > AntOut-RF )
    Con: VCR ( VCRIn-RF > AntOut-RF )
)
Block: VCR(
    #Type: Selector
    #BlkCtrl: VCR
    In: In-SAudio
    In: In-CVideo
    Out: Out-SAudio
    Out: Out-CVideo
    Ctrl: VCR ( Type:MultiPos   Max:2   Step:1   Unsd:0   Val( Stop
                Play Rec ) Tran( Type:Random   CVal:0   Reset:POR   Signal(
                VCRModeChg VCRModeChg VCRModeChg )   TOut:3   Code( "Stop"
                "Stop Play" "Stop Rec" ) ) )
    Block: Tape(
        #Type: Mediatransport
        #UserName: "VCR"
        In: Rec-SAudio
        In: Rec-CVideo
        Out: Play-SAudio
        Out: Play-CVideo
        Ctrl: Transport ( Type:MultiPos   Max:3   Step:1   Unsd:0   Opt(
                    Vide Audio VCR )   Val( Norm FF RR Pause ) Tran(
                    Type:Random   CVal:0   Reset:VCRModeChg   CodeIndex:VCR
                    Code( "Stop" "FF" "RR" "X" "Play" "FF" "RR" "Paus"
                    "Rec" "X" "X" "Paus" ) ) )
    )
    Con: Stop ( In-SAudio > Out-SAudio )
    Con: Stop ( In-CVideo > Out-CVideo )
    Con: Rec ( In-SAudio > Out-SAudio 9900 )
    Con: Rec ( In-CVideo > Out-CVideo 9900 )
    Con: Rec ( In-SAudio > Tape.Rec-SAudio )
    Con: Rec ( In-CVideo > Tape.Rec-CVideo )
    Con: Play ( Tape.Play-SAudio > Out-SAudio )
    Con: Play ( Tape.Play-CVideo > Out-CVideo )
)
Block: VCRSwitch(
    #Type: Selector
    #BlkCtrl: Input
    In: Video2-SAudio
    In: Video2-CVideo
    In: Video1-SAudio
    In: Video1-CVideo
    In: Tuner-SAudio
    In: Tuner-CVideo
    Out: Out-SAudio
    Out: Out-CVideo
    Ctrl: Input ( Type:MultiPos   Max:2   Step:1   Unsd:0   Val( Tuner
```

-continued

```
            Video1 Video2 ) Tran( Type:Serial   CVal:0    Sta:"Paus"
               Sel:"Inpt"    End:"Paus" ) )
      Con: Tuner ( Tuner-SAudio > Out-SAudio )
      Con: Tuner ( Tuner-CVideo > Out-CVideo )
      Con: Video1 ( Video1-SAudio > Out-SAudio )
      Con: Video1 ( Video1-CVideo > Out-CVideo )
      Con: Video2 ( Video2-SAudio > Out-SAudio )
      Con: Video2 ( Video2-CVideo > Out-CVideo )
   )
   Block: RFModulator(
      #Type: Modulator
      #Pref: 9500
      In: In-SAudio
      In: In-CVideo
      Out: Out-RF
      Con: Modulator ( In-SAudio > Out-RF )
      Con: Modulator ( In-CVideo > Out-RF )
   )
   Con: 0 ( AntIn-RF > RFSwitch.AntIn-RF )
   Con: 0 ( RFModulator.Out-RF > RFSwitch.VCRIn-RF )
   Con: 0 ( RFSwitch.AntOut-RF > AntOut-RF )
   Con: 0 ( AntIn-RF > Tuner.AntIn-RF )
   Con: 0 ( Tuner.Out-SAudio > VCRSwitch.Tuner-SAudio )
   Con: 0 ( Tuner.Out-CVideo > VCRSwitch.Tuner-CVideo )
   Con: 0 ( Video1-SAudio > VCRSwitch.Video1-SAudio )
   Con: 0 ( Video1-SVideo > VCRSwitch.Video1-CVideo )
   Con: 0 ( Video1-CVideo > VCRSwitch.Video1-CVideo )
   Con: 0 ( Video2-SAudio > VCRSwitch.Video2-SAudio )
   Con: 0 ( Video2-CVideo > VCRSwitch.Video2-CVideo )
   Con: 0 ( VCRSwitch.Out-SAudio > VCR.In-SAudio )
   Con: 0 ( VCRSwitch.Out-CVideo > VCR.In-CVideo )
   Con: 0 ( VCR.Out-SAudio > Out-SAudio )
   Con: 0 ( VCR.Out-CVideo > Out-SVideo )
   Con: 0 ( VCR.Out-CVideo > Out-CVideo )
   Con: 0 ( VCR.Out-SAudio > RFModulator.In-SAudio )
   Con: 0 ( VCR.Out-CVideo > RFModulator.In-CVideo )
)
```

The above topology description defines an outer block entitled 'VCR' that describes VCR 205 including available inputs and outputs and the internal electronic construction. More specifically, the VCR block defines a 'Power' control, four different types of acceptable media: Saudio, Cvideo, Svideo and RF, and six inputs and four outputs that correspond to inputs 422 and outputs 420 (FIG. 5), respectively. Sub-blocks are defined for each internal electronic module including VCR switch 402, tuner 404, RF switch 406, RF modulator 408 and VCR module 410 that includes tape controller 412. Each sub-block defines inputs and outputs for the internal electronic module. The VCR block defines connections between sub-blocks while each sub-block defines internal connections.

The above example and description illustrate various embodiments of a computing system that processes topology descriptions for the electronic components of an electronic environment, such as an audio/video home entertainment center, in order to display possible configurations, monitor usage, and even directly control the electronic components. In one embodiment a user manually enters the topology descriptions for each electronic component via a user interface. In another embodiment, a corresponding manufacturer of each electronic component provides a diskette containing a topology description for the respective electronic component. In yet another embodiment the topology descriptions for each electronic component are downloaded from the Internet. A user interface displays acceptable configurations of the electronic components such that the user may select one of the configurations. In one embodiment the user interface graphically depicts the electronic components such that the user can graphically connect the various inputs and outputs by using a mouse or other pointing device. This application is intended to cover any adaptation or variation of the present invention. It is manifestly intended that this invention be limited only by the claims and equivalents thereof.

I claim:

1. A computerized method of controlling a plurality of electronic components comprising:
   processing topology descriptions for each electronic component to generate topology data;
   receiving interconnection data for the electronic components;
   displaying controls for the electronic components as a function of the received topology and interconnection data; and
   controlling the electronic components in response to user inputs to the displayed controls.

2. The method of claim 1, wherein processing the topology descriptions includes:
   displaying inputs and outputs of electronic components based on the generated topology data; and
   receiving from a user an interconnection for the inputs and outputs.

3. The method of claim 1, further including receiving the topology descriptions from a user.

4. The method of claim 3, wherein receiving the topology descriptions includes reading the topology descriptions from a diskette provided by a manufacturer.

5. The method of claim 3, wherein receiving the topology descriptions includes downloading the topology descriptions via the Internet.

6. The method of claim 2, wherein displaying the list of inputs and outputs includes graphically representing electronic components and the inputs and outputs.

7. The method of claim 6, wherein receiving the interconnection includes graphically connecting the inputs and outputs in response to a user request.

8. The method of claim 2, wherein displaying the inputs and outputs includes graphically displaying the controls to the user.

9. A computer-readable medium having computer-executable instructions for performing the method of claim 1.

10. A computing system comprising:
- a topology engine to generate topology data from topology descriptions of electronic components and their interconnections, and to generate a set of controls based upon the topology data;
- a user interface to display the controls and to receive user commands with respect to the controls;
- a control module to generate outputs to control the components based on the user commands;
- an output port to communicate the outputs to the electronic components.

11. The computing system of claim 10, wherein the topology engine generates a list of input and outputs for the electronic components based on the topology data, and further wherein a user defines an interconnection for the inputs and outputs via the user interface.

12. The computing system of claim 10, wherein the topology engine generates the set of controls as a function of the interconnection.

13. The system of claim 10, wherein the user interface also receives the topology descriptions.

14. The system of claim 13, further comprising media from one or more manufacturers of the electronic components specifying the topology descriptions.

15. The system of claim 10, further comprising at least one control device associated with at least one of the electronic components to communicate with the output port.

16. The system of claim 15, further comprising a plurality of the electronic components coupled to the at least one control device so as to set physical controls in accordance with the outputs of the control module.

17. The system of claim 16, wherein the at least one control device is a single control device coupled to more than one of the electronic components.

18. In combination:
- one electronic component having inputs and outputs for interconnection with a range of other electronic components to form a system;
- a computer-readable medium associated with the one component and bearing a description of the inputs and outputs in a standardized topology language describing in the same way the range of other electronic components and their possible interconnections with the one component,
- wherein the component further has controls, and the medium further bears a description of the controls in the standard topology language.

19. The combination of claim 18, wherein the standard topology language describes other controls for the range of other components in the same way.

20. The combination of claim 18, wherein the standardized topology language describes interconnections among the one component and the other components in the system.

21. In combination:
- one electronic component having inputs and outputs for interconnection with a range of other electronic components to form a system;
- a computer-readable storage medium supplied by the manufacturer of the component, associated with the one component and bearing a description of the inputs and outputs in a standardized topology language describing in the same way the range of other electronic components and their possible interconnections with the one component.

* * * * *

UNITED STATES PATENT AND TRADEMARK OFFICE
CERTIFICATE OF CORRECTION

PATENT NO. : 6,430,526 B1
DATED : August 6, 2002
INVENTOR(S) : Kim R. Toll

It is certified that error appears in the above-identified patent and that said Letters Patent is hereby corrected as shown below:

Title page,
Item [74], under "Attorney", delete "Schwegman Lundberg Woessner & Kluth" and insert -- Schwegman, Lundberg, Woessner & Kluth, P.A. --, therefor.

Column 1,
Line 11, delete "Background Information" and insert -- Background --, therefor.

Column 2,
Line 50, delete "an" and insert -- a --, before "receiver", therefor.

Column 3,
Line 13, delete "may be" after "may be".

Column 6,
Line 47, delete ":wr" and insert -- Pwr --, therefor.
Line 61, delete "LIne" and insert -- Line --, therefor.

Column 15,
Line 42, delete "defmed" and insert -- defined --, therefor.

Signed and Sealed this

Tenth Day of December, 2002

JAMES E. ROGAN
*Director of the United States Patent and Trademark Office*